US008830886B2

(12) United States Patent
Ekbatani et al.

(10) Patent No.: US 8,830,886 B2
(45) Date of Patent: Sep. 9, 2014

(54) WIRELESS COMMUNICATION DEVICE CAPABLE OF CONTROLLING SIGNAL POLARIZATION BASED ON CHANNEL CONDITIONS

(75) Inventors: Siavash Ekbatani, Laguna Niguel, CA (US); Alireza Tarighat Mehrabani, Laguna Beach, CA (US); Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 18 days.

(21) Appl. No.: 13/435,131

(22) Filed: Mar. 30, 2012

(65) Prior Publication Data

US 2013/0148553 A1    Jun. 13, 2013

Related U.S. Application Data

(60) Provisional application No. 61/556,094, filed on Nov. 4, 2011.

(51) Int. Cl.
*H04B 7/00*    (2006.01)

(52) U.S. Cl.
USPC .......................................... 370/310; 370/476

(58) Field of Classification Search
CPC ....................................................... H04B 7/10
USPC ................................. 370/310, 476
See application file for complete search history.

(56) References Cited

U.S. PATENT DOCUMENTS

| 5,584,057 | A | * | 12/1996 | Dent ............................ 455/101 |
| 7,627,291 | B1 | * | 12/2009 | James-Roxby et al. ........ 455/73 |
| 7,869,416 | B2 | * | 1/2011 | Ramakrishna et al. ....... 370/345 |
| 2002/0083458 | A1 | | 6/2002 | Henderson et al. |
| 2006/0035608 | A1 | * | 2/2006 | Zhang et al. .................. 455/129 |
| 2009/0034643 | A1 | * | 2/2009 | Ahn et al. ..................... 375/267 |
| 2009/0225885 | A1 | * | 9/2009 | Aoki et al. .................... 375/260 |
| 2012/0039321 | A1 | * | 2/2012 | Ghosh et al. .................. 370/338 |
| 2013/0065537 | A1 | * | 3/2013 | Yepez et al. ............... 455/67.13 |

FOREIGN PATENT DOCUMENTS

JP    2003-046422 A    2/2003

* cited by examiner

*Primary Examiner* — Un C Cho
*Assistant Examiner* — Fangyan Deng
(74) *Attorney, Agent, or Firm* — Sterne, Kessler, Goldstein & Fox PLLC

(57) ABSTRACT

Wireless communication devices are disclosed that are capable of selecting and changing signal polarities depending on channel conditions in order to improve or optimize communication therebetween. When a first polarization direction is deemed inadequate, the devices can switch to communicating via a second polarization. In addition, information relating to received signal qualities in the different polarizations can be stored in each device to allow for quick and efficient exchanges between configurations. Finally, when conditions warrant, the devices can enter a dynamic polarization configuration in which signal polarizations are switched rapidly so as to enjoy benefits of diversity.

17 Claims, 8 Drawing Sheets

WIRELESS COMMUNICATION DEVICE CAPABLE OF CONTROLLING SIGNAL POLARIZATION BASED ON CHANNEL CONDITIONS

CROSS REFERENCE TO RELATED APPLICATIONS

This application claims the benefit of U.S. Provisional Application No. 61/556,094, filed Nov. 4, 2011.

BACKGROUND

1. Field of Invention

The disclosure relates to wireless communications, and more specifically to a wireless communication device that is capable of controlling polarization of signals based on channel conditions.

2. Related Art

Wireless communication devices, such as cellular telephones to provide an example, are becoming commonplace in both personal and commercial settings. The wireless communication devices provide users with access to all kinds of information, as well as the ability to communicate with other such devices across large distances. For example, a user can access the internet through an internet browser on the device, download miniature applications (e.g., "apps") from a digital marketplace, send and receive emails, or make telephone calls using a voice over internet protocol (VoIP). Consequently, wireless communication devices provide users with significant mobility, while allowing them to remain "connected" to communication channels and information.

Wireless communication devices communicate with one or more other wireless communication devices or wireless access points to send and receive data. Typically, a first wireless communication device generates and transmits a radio frequency signal modulated with encoded information. This radio frequency signal is transmitted into a wireless environment and is received by a second wireless communication device. The second wireless communication device demodulates and decodes the received signal to obtain the information. The second wireless communication device may then respond in a similar manner. The wireless communication devices can communicate with each other or with access points using any well-known modulation scheme, including simple amplitude modulation (AM), simple frequency modulation (FM), quadrature amplitude modulation (QAM), phase shift keying (PSK), quadrature phase shift keying (QPSK), and/or orthogonal frequency-division multiplexing (OFDM), as well as any other communication scheme that is now, or will be, known.

During communication between wireless communication devices, signals sent from the first wireless communication device to the second will be transmitted with some original polarity. However, during transmission through the communication channel, that signal will likely reflect on one or more surfaces, with each reflection changing the polarity of the signal. Therefore, the second wireless communication device often does not receive the signal with the same polarity in which that signal was transmitted. In addition, the communication channel has a different channel response for different polarities.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION OF THE INVENTION

Figure 1:
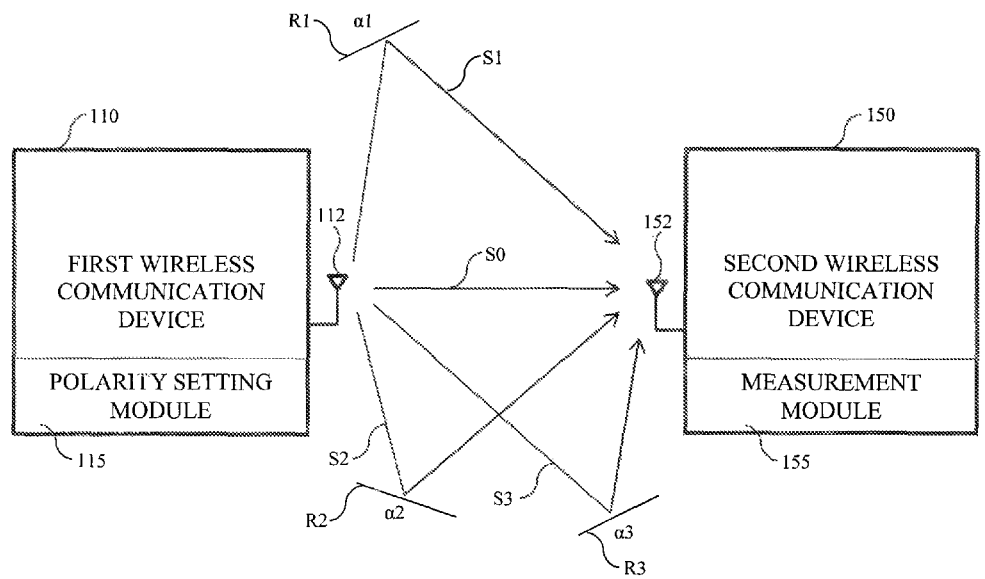
FIG. 1 illustrates a block diagram of an exemplary wireless communication environment.

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer, as described below.

For purposes of this discussion, the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the following description is to be described in terms of wireless communication (specifically cellular communication), those skilled in the relevant art(s) will recognize that this description may also be applicable to other communications that use wired, optical, or other wireless communication methods without departing from the spirit and scope of the present disclosure.

An Exemplary Wireless Communications Environment

FIG. 1 illustrates a block diagram of a wireless communication environment 100 according to an exemplary embodiment of the invention. The wireless communication environment 100 provides wireless communication of information, such as one or more commands and/or data, between wireless communication devices. The wireless communication devices may each be implemented as a standalone or a discrete device, such as a mobile telephone, or may be incorporated within or coupled to another electrical device or host device, such as a portable computing device, a camera, or a Global Positioning System (GPS) unit or another computing device such as a personal digital assistant, a video gaming device, a laptop, a desktop computer, or a tablet, a computer peripheral such as a printer or a portable audio and/or video player to provide some examples and/or any other suitable electronic device that will be apparent to those skilled in the relevant art(s) without departing from the spirit and scope of the invention.

The exemplary wireless communication environment 100 includes a first wireless communication device 110 and a second wireless communication device 150. The first wireless communication device 110 may represent an exemplary embodiment of a base station, and the second wireless communication device 150 may represent an exemplary embodiment of a user equipment within a cellular communications network.

The first wireless communication device 110 includes a polarity setting module 115 for setting a polarity of transmitted signals, and includes an antenna 112 for transmitting the signals into the wireless communication environment 100. Herein, "polarity" refers the electric field polarity of transmitted wireless signal as it is radiated from the transmitting antenna, and may include one of horizontal polarity, or vertical polarity, or other known polarities for example. The second wireless communication device 150 includes an antenna 152 for receiving the signals from the wireless communication environment 100, and includes a measurement module 155 for measuring channel conditions with respect to different polarities. Those skilled in the relevant art(s) will recognize that each of the antenna 112 and the antenna 152 may include one or more antennas, and may be capable of both transmitting and receiving signals.

The wireless communication environment 100 may also include a plurality of reflection surfaces R1, R2 and R3 which reflect the transmitted signals on their paths from the first wireless communication device 100 to the second wireless communication device 150. For example, a signal S0 is transmitted directly from the first wireless communication device 110 to the second wireless communication device 150 without any intervening reflections; signal S1, transmitted at a transmission angle $\alpha 1$, is reflected by reflection surface R1; signal S2, transmitted at a transmission angle $\alpha 2$, is reflected by reflection surface R2; and signal S3, transmitted at a transmission angle $\alpha 3$, is reflected by reflection surface R3.

Detailed functionality of the first wireless communication device 110 and the second wireless communication device 150, as well as the effects of the reflection surfaces R1-R3, is discussed below.

Exemplary Wireless Communication Devices

Figure 2:
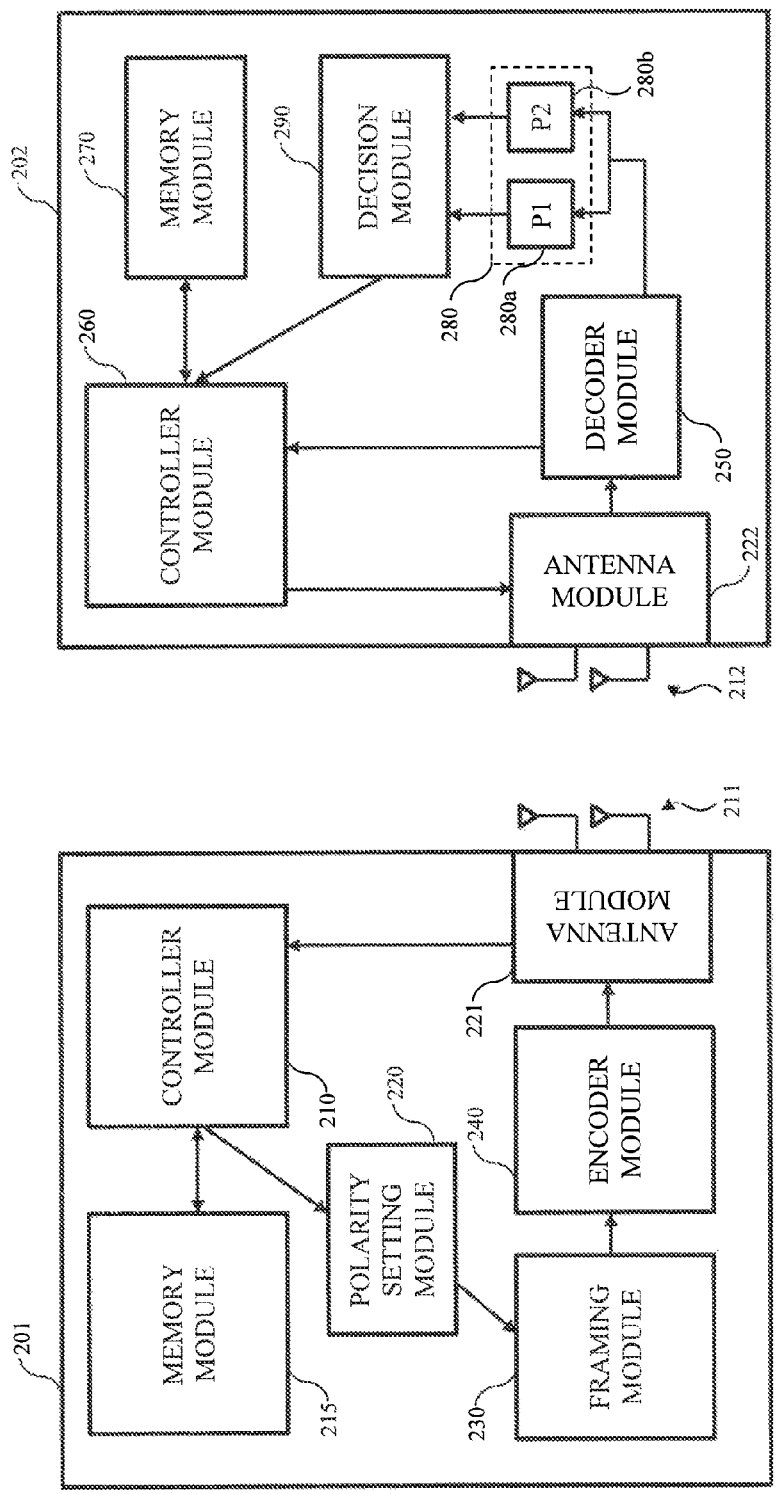
FIG. 2 illustrates a block diagram of an exemplary first wireless communication device and an exemplary second wireless communication device that are implemented as part of the wireless communication environment.

FIG. 2 illustrates a block diagram of an exemplary first wireless communication device 201 and an exemplary second wireless communication device 202 that may be implemented as part of the wireless communication environment 100. The first wireless communication device 201 includes a polarity setting module 220 and a framing module 230, and may represent an exemplary embodiment of the first wireless communication device 110. The second wireless communication device 202 includes a measurement module 280 and a decision module 290, and may represent an exemplary embodiment of the second wireless communication device 150.

Transmission

For purposes of this discussion, the first wireless communication device 201 will be described with respect to preparing and transmitting signals. Therefore, only the functionality of the first wireless communication device 201 relating to preparing and transmitting signals will be discussed. However, it will be understood that the first wireless communication device 201 may also receive signals, in either a conventional manner, or as described below with respect to the second wireless communication device 202.

The first wireless communication device 201 includes an antenna module 221 for sending signals to, and receiving signals from, the wireless communication environment 100 via an antenna array 211, which may include one or more antennas. The first wireless communication device 201 also includes a controller module 210 for performing general background control, as well as for processing signals received from the antenna module 221, and a memory module 215 capable of storing various digital information.

The first wireless communication device 201 also includes a polarity setting module 220 for setting a polarity of outgoing signals based on information received from the controller module 210. The polarity setting module 220 communicates with a framing module 230, which prepares data sub-frames for transmission based in part of the polarity setting module 220. Once the data sub-frames have been prepared, an encoder module 240 encodes the data sub-frames and forwards the encoded sub-frames to the antenna module 221 for transmission to wireless communication environment. It will be noted that the antenna module 221 may include the necessary transmitter and receiver RF front-end functionality to effect wireless communications (e.g. amplifiers, mixers, filters, local oscillators, etc.) in attention to the antenna array 211, as will be understood by those skilled in the arts.

As discussed above, the first wireless communication device 201 and the second wireless communication device 202 should preferably select a polarization orientation for communication that has the best channel response, but the channel response likely differs for each polarization option. Therefore, when preparing sub-frames for communication, the framing module 230 prepares them in such a way as to allow for channel measurements of both polarities by a receiver.

Figure 3:
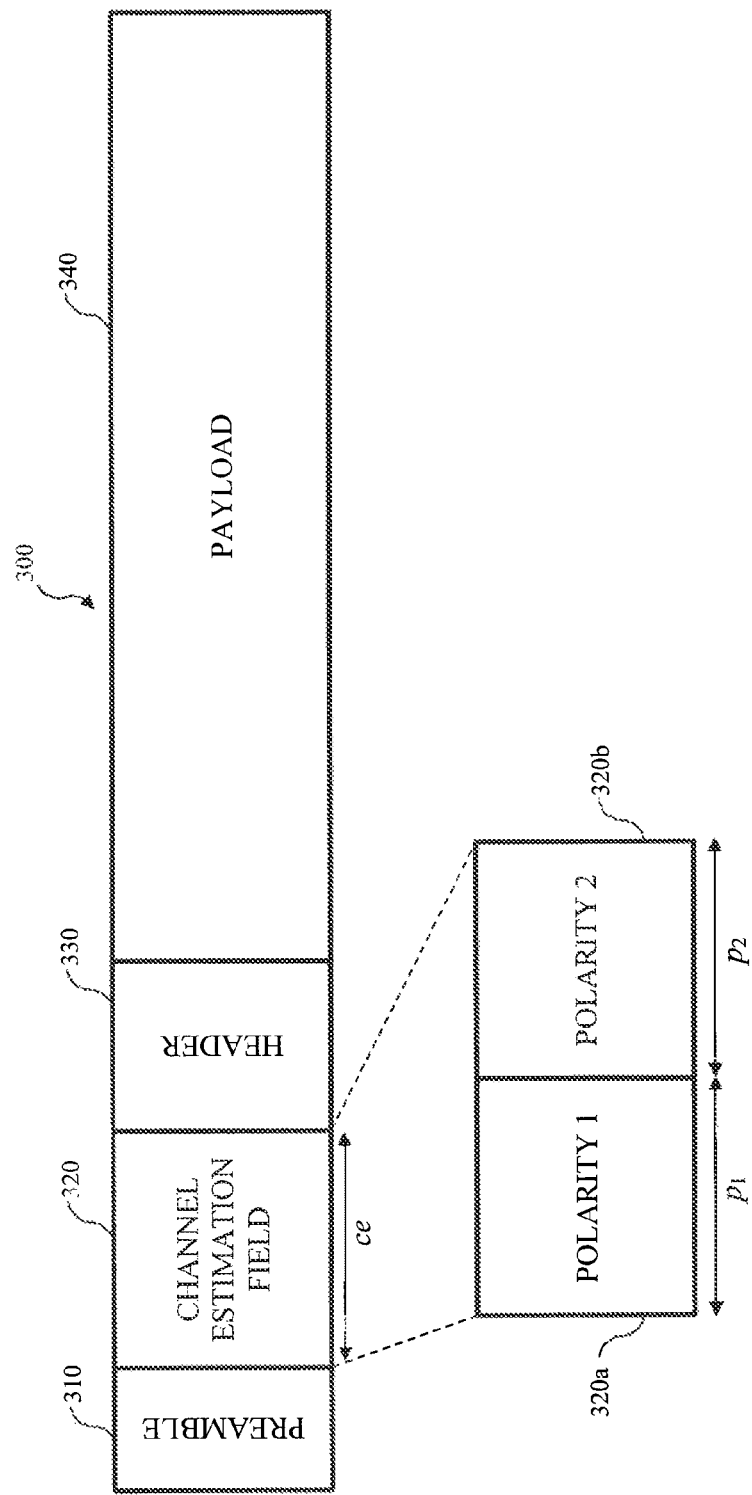
FIG. 3 illustrates an exemplary data sub-frame generated by the first wireless communication device.

FIG. 3 illustrates an exemplary data sub-frame 300 generated by the first wireless communication device 201. Like most data sub-frames, the sub-frame 300 includes a preamble portion 310, a channel estimation field portion 320, a header portion 330, and a payload portion 340. Conventionally, the channel estimation field 320 includes preset information or tones. This allows a receiver to measure the channel response by analyzing the received channel estimation field and determining the effect that the channel had on that known information. However, conventional channel estimation fields are transmitted in a single polarity, which allows for the receiver only to measure the channel with respect to that single polarity.

In order to allows the receiver to measure multiple polarities, the channel estimation field 320 of the sub-frame 300 is split into a first polarity portion 320a and a second polarity portion 320b. The first polarity portion 320a is set to a first polarity (e.g., vertical or right-hand circular) and the second polarity portion is set to a second polarity that is orthogonal to the first polarity (e.g., horizontal or left-hand circular).

In this manner, the sub-frame 300 is transmitted by the first wireless communication device 201 with a channel estimation field 320 that includes at least two orthogonal polarities. Consequently, the sub-frame that is ultimately received by the second wireless communication device 202 will also include a channel estimation field 320 that includes two orthogonal polarities. Specifically, because of the orthogonality of the polarities within the channel estimation field 320, regardless of reflections that occur during communication, the first polarity portion 320a and the second polarity portion 320b will not interfere with one another. Consequently, the second wireless communication device 202 will be able to measure channel response for each of the two polarities simultaneously, as discussed in further detail below.

In addition, depending on one or more parameters, the framing module 230 may dynamically generate the channel estimation field 320 so that its first polarity portion 320a and second polarity portion 320b are different in size in order to improve or optimize measurements. For example, the framing module 230 may reduce the size of one of the polarity portions in order to allow for an expansion in the size of the other polarity portion. This may be desired based on which polarity is currently being used for communication, signal quality of received signals, and/or channel conditions, among other parameters within the spirit and scope of the present disclosure. Signal quality may be measured, for example, as signal-to-noise ratio (SNR), signal to interference-plus-noise ratio (SINR), received signal strength indicator (RSSI), bit error rate (BER), etc.

For example, if the first wireless communication device 201 is currently transmitting signals using a first polarity, the framing module 230 may increase the size of the second polarity portion 320b so as to provide more information to be used for measuring the second polarity channel response. In this manner, the framing module 230 can improve or optimize the sizes of the polarity portions of the channel estimation field 320, provided that the size of the first polarity portion $p_1$ plus the size of the second polarity portion $p_2$ is equal to the size of the channel estimation field ce.

Reception

For purposes of this discussion, the second wireless communication device 202 will be described with respect to receiving and analyzing signals from the first wireless communication device 201. Therefore, only the functionality of the first wireless communication device relating to these features will be discussed in detail. However, it will be understood that the second wireless communication device 202 may also transmit signals, in either a conventional manner, or as described above with respect to the first wireless communication device 201.

The second wireless communication device 202 includes an antenna module 222 that receives signals from the wireless communication environment 100 via an antenna array 212, which may include one or more antennas. The antenna module 222 forwards received signals to a decoder module 250, which decodes the received signals. The second wireless communication device 202 also includes a controller module 260, which performs general background control, as well as processes the decoded signals received from the decoder module 250, and a memory module 270 capable of storing various digital information. It will be noted that the antenna module 222 may include the necessary transmitter and receiver RF front-end functionality to effect wireless communications (e.g. amplifiers, mixers, filters, local oscillators, etc.) in attention to the antenna array 212, as will be understood by those skilled in the arts.

In addition to forwarding the decoded signals to the controller module 260, the decoder module 250 also forwards the decoded signals to a measurement module 280. The measurement module 280 includes a first polarity measurement module 280a and a second polarity measurement module 280b. The received signal is sent to each of the first polarity measurement module 280a and the second polarity measurement module 280b, each of which measures channel conditions from the received signal.

Presuming that the signal received by the second wireless communication device 202 has a format as shown in FIG. 3, then the first polarity measurement module 280a measures the channel response with respect to the first polarity based on the first polarity portion 320a of the channel estimation field 320. Similarly, the second polarity measurement module 280b measures the channel response with respect to the second polarity based on the second polarity portion 320b of the channel estimation field 320. As discussed above, the channel estimation sub-fields 320a,b include predetermined information or tones. Therefore, measurements modules 280a, 280b measure the channel response by analyzing the respective received channel estimation sub-field and determining the effect that the channel had on the known information. In this manner, the second wireless communication device 202 is able to simultaneously measure channel response for multiple different polarities using a single data sub-frame.

It should be noted that the measurement module 280 may determine the locations of the first polarity portion 320a and the second polarity portion 320b within the received data sub-frame from information included within the preamble portion 310 and/or the header portion 330 of the received data sub-frame 300. Alternatively, the measurement module 280 may conceivably include hardware, software, and/or firmware for determining the boundaries of the first polarity portion 320a and the second polarity portion 320b without any additional information.

Once the channel response has been measured with respect to each of the polarities, the measurement module 280 forwards the results to a decision module 290. The decisions module 290 determines, based on the received channel response information, which polarity is preferred and/or whether to initiate a polarity switch in order to switch from a current communication polarity to an alternative polarity. The decision module 290 may make its determination based on any number of factors, including which polarity exhibits better channel response, the current communication polarity, and the difference between the channel response of the alternative polarity and the channel response of the current polarity, etc. After making its decision, the decision module 290 forwards the result to the controller module 260 for further processing, as discussed below.

Static Polarization Coordinated Communication

During communication, there are many ways in which the first wireless communication device 201 and the second wireless communication device 202 can coordinate with each other so as to communicate using the most preferred signal polarity, among other signal characteristics.

1. Polarization Switching

As discussed above, it is important during communication for the second wireless communication device 202 to select a polarization for future signals transmitted by the first wireless communication device 201. Therefore, measurement module 280 measures the channel response with respect to the different polarizations included within the channel estimation field 320 of the received sub-frame 300. Once measured, the decision module 290 makes a determination, based on the measured channel responses, as to whether to initiate a switch from a current polarity to the alternative polarity.

If the decision module 290 determines that a switch should be initiated, for any of the reasons discussed previously, the decision module 290 reports this determination to the controller module 260. The controller module 260 then generates and forwards a polarity instruction signal to the antenna module for transmission to the first wireless communication device. It should be noted that a similar procedure may be performed in order to select an initial signal polarity.

Upon receipt of the polarity instruction signal by the first wireless communication device 201, the antenna module 221 forwards the polarity instruction signal to the controller module 210. The controller module 210 processes the polarity instruction to determine how to set its polarity, and forwards the result to the polarity setting module 220. When preparing future data for transmission, the framing module 230 prepares data sub-frames with the polarity set in the polarity setting module 220. In this manner, the first wireless communication device 201 is able to accommodate the preferred polarity (e.g., the polarity that provides the better channel response) as measured by the second wireless communication device 202.

Figure 4:
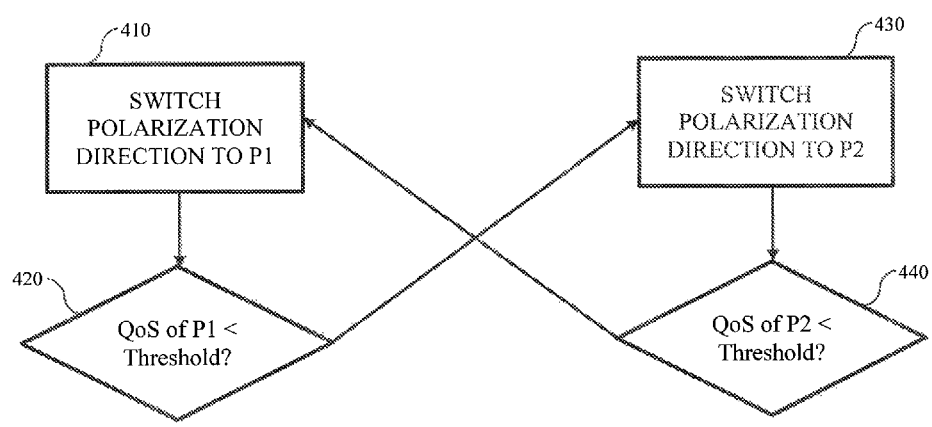
FIG. 4 illustrates a block diagram of an exemplary method for selecting a polarization direction of a transmitted signal.

FIG. 4 illustrates a block diagram of an exemplary method for selecting a polarization direction of a transmitted signal in accordance with the above description.

Presuming that the second wireless communication device 202 is currently receiving signals having the first polarity. The device remains in this configuration until one or more conditions have been met (420). Example conditions may include whether Quality of Service (QoS) of the received signals falls below a predetermined threshold, whether the channel response of the alternative polarity is significantly better than the channel response of the current polarity, etc., to provide some examples.

Once the conditions have been met, the second wireless communication device 202 initiates the polarization switch to a second polarization (430). At this time, the first wireless communication device 201 begins transmitting signals having the second polarization, and the second wireless communication device 202 begins monitoring the received signals having the second polarization (440). The devices remain in this configuration until a second set of conditions (which may be the same or different from those discussed above regarding the first polarity) have been met. When the conditions have been met, the device again initiates a switch back to the first polarity. (410)

In this manner, the wireless communication devices can continue to communicate using an optimal signal polarization. Consequently, negative effects of the channel can be reduced, and signal quality can be improved.

2. Angle Selecting

Another parameter that may be controlled is transmission angle of transmitted signals. Those skilled in the relevant art(s) will recognize that beam-forming and other directivity techniques allow wireless transmitters to direct wirelessly-transmitted signals in a particular physical direction, so that mainbeam and/or sidelobes of the radiated signal can be steered in space.

As discussed above, and as shown in FIG. 1, the first wireless communication device 110 may transmit signals to the second wireless communication device 150 in any of multiple different directions, each of which will have its own channel response for each different polarity. Therefore, by comparing the responses of the different transmission angles, further improvement or optimization can be achieved for improving signal quality.

In order to select a preferred transmission angle, the wireless communication devices may coordinate the initiation of a transmission sweep. The sweep may consist of transmitting signals over a period of time in each of a plurality of different directions (preferably in some predetermined order). During this period, the second wireless communication device 150 measures characteristics of the received signals. These characteristics are preferably the channel response of the first polarity portion 320a and the second polarity portion 320b of the received sub-frames, but may additionally or alternatively include other measurements, such as QoS, for example.

Figure 5:
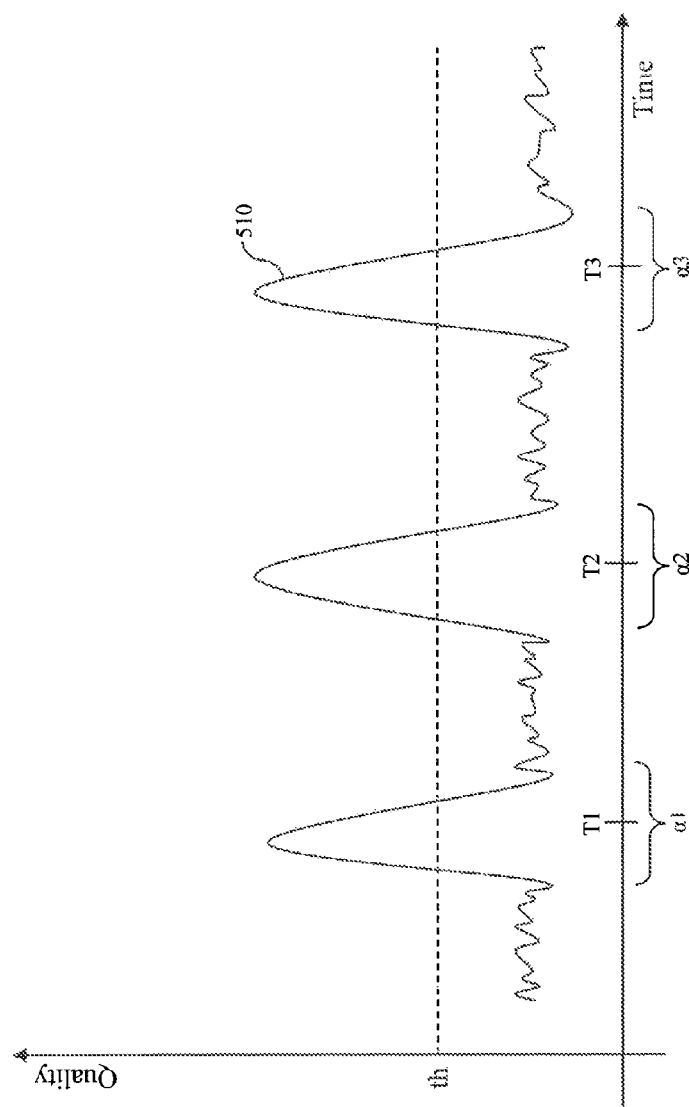
FIG. 5 illustrates an exemplary signal quality measurement determined by the second wireless communication device.

FIG. 5 illustrates an exemplary signal quality measurement determined by the second wireless communication device 150. As shown in FIG. 5, there are several periods of very poor signal quality, which correspond to particularly noisy communication paths, or paths that do not adequately reflect the signal to the second wireless communication device 150. Between those low-quality periods are bursts of high-quality periods, which correspond to low-noise paths and/or paths whose reflections direct the signal to the second wireless communication device 150.

From this signal quality measurement, the second wireless communication device 150 can determine the high-quality transmission angles by comparing the measured signal quality to a predetermined threshold th. As discussed above, signal quality may be measured, for example, as signal-to-noise ratio (SNR), signal to interference-plus-noise ratio (SINR), received signal strength indicator (RSSI), bit error rate (BER), etc. Times at which the received signal quality was above the threshold th (e.g., times T1, T2 and T3) are then reported to the first wireless communication device 110 along with the measured time having the best signal quality (e.g., time T3).

The first wireless communication device 110 matches the received time information with its transmission angles. For example, the first wireless communication device 110 determines that at time T1, it was transmitting at angle α1; at time T2, it was transmitting at angle α2; and at time T3, it was transmitting at angle α3. The transmitter then sets the transmission angle to angle α3 corresponding to the best signal quality identified by the second wireless communication device.

In this manner, the devices are able to select an improved or optimized communication path in addition to selecting a preferred polarity.

3. Data Management

In order to streamline coordination and switching between the first wireless communication device 201 and the second wireless communication device 202, it may be beneficial for each of those devices to maintain and update a table of information relating to each of the different possible link combinations.

As discussed above, each polarity and each transmission direction result in a different channel response, and therefore different communication qualities. Further, additional information may also be tracked (discussed below), which adds to the complexity of selecting new communication parameters. Therefore, the first and second wireless communication devices can maintain measured information in order to quickly and efficiently maintain communication optimization.

TABLE 1

Example information stored for efficient switching

| POLARITY | ANGLE | QUALITY |
|---|---|---|
| Polarity 1 | Angle α1 | Q1 |
|  | Angle α2 | Q2 |
|  | Angle α3 | Q3 |
| Polarity 2 | Angle α1 | Q4 |
|  | Angle α2 | Q5 |
|  | Angle α3 | Q6 |

Table 1, above, illustrates an exemplary table of information that may be shared between the first wireless communication device 201 and the second wireless communication device 202. As discussed above, each of the first wireless communication device 201 and the second wireless communication device 202 may measure various information during communication, which can then be shared with the other device so that each maintains a table of possible communication parameters.

For example, the second wireless communication device 202 may be capable of measuring channel response for each polarity, whereas the first wireless communication device 201 may be capable of pairing signal qualities measured by the second wireless communication device 202 with transmission angles. When the first wireless communication device 201 generates measurement information that is pertinent to the communication, the controller module 210 stores that information in the memory module 215 for future reference. Similarly, for measurement information generated by the second wireless communication device 202, the controller module 260 causes the information to be stored in the memory module 270 for future reference.

This information may be stored in the form of a correspondence table, similar to Table 1, above. In other words, signal quality or channel response measurements may be stored in correspondence with the communication parameters associated with those measurements, such as polarity, transmission angle, etc. In addition, in order to maintain synchronization with each other, the first and second wireless communication devices may share their own measurement information with the other. Further, the information contained within the tables may be occasionally updated. This may be performed at specific intervals, or after certain conditions have been met, such as change in channel conditions, etc.

Utilizing these techniques, the wireless communication devices can synchronize their data tables with one another in order to streamline parameter switches. For example, during communication, the second wireless communication device 202 may determine that current communication parameters are producing unacceptable signal quality and/or channel response. Consequently, the second wireless communication device 202 initiates a switch from the current set of communication parameters to another set of parameters. Because the second wireless communication device 202 maintains a data table with the signal qualities of other sets of communication parameters, the second wireless communication device 202 can immediately select a new set of communication parameters simply by identifying the stored set of parameters having the best signal quality, or selecting a set of parameters whose signal quality exceeds a predetermined threshold.

In addition, in order to adapt the first wireless communication device 201 to the newly-selected communication parameters, the second wireless communication device 202 need only communicate that a switch has been initiated. Because the first wireless communication device 201 maintains the same table as the second wireless communication device 202, the first wireless communication device 201 can immediately adjust to the new parameters by selecting the set of parameters that are stored in correspondence with the best signal quality, or selecting a set of parameters whose signal quality exceeds a predetermined threshold. In other words, the table provides a pre-determined ranking of signal quality for the various combinations of polarizations and angle of transmission.

In this manner, the first and second wireless communication devices can quickly and efficiently switch communication parameters when circumstances warrant. Consequently, the devices can maintain communication optimization with very little transition time.

4. Antenna Shaping

As discussed above, the first wireless communication device 201 and the second wireless communication device 202 include antenna arrays 211 and 212, respectively. When these antenna arrays include multiple antennas, communication can be further optimized by adjusting the parameters of each antenna within each array individually. Specifically, whereas the above discussions presumed that communication parameters (polarity, direction, etc.) are applied to all antennas, further improvement or optimization can be achieved by applying individual parameters to individual antennas, or subsets of antennas, in the antenna array.

For example, during the channel estimation, the second wireless communication device 202 may measure the channel response for each antenna of its array. The second wireless communication device can then set the polarities and/or other properties of each of its individual antennas based on the measurement results.

In addition, this antenna-based optimization can be coordinated with the first wireless communication device 201. For example, based on the measurements by the second wireless communication device 202, the first wireless communication device can set parameters for each of its antennas. Further, by coordinating a directionality scan between the devices, the first wireless communication device 201 can adjust each individual antenna, or small groups of antennas, to transmit signals in different directions depending on the measurement data determined by the second wireless communication device.

In order to aid this operation, it is again beneficial for the second wireless communication device 202 and the first wireless communication device 201 to share measurement information so that both can maintain a table of signal qualities based on various parameters. Of course, the addition of being able to adjust each individual antenna will add at least one additional layer of complexity to the tables. In other words, Table 1 (shown above) will exist for each individual antenna, or subsets of antennas, for example.

In this manner, the devices can further increase optimization and detail in order to even further improve communication.

Dynamic Polarization Coordinated Communication

The above provides various static polarization configurations, which select a configuration and remain in that configuration until some future event. However, in certain circumstances, it may be preferably to communicate via a dynamic polarization configuration, in which the polarization repeatedly switches without the occurrence of any particular event. This may be particularly beneficial when there is no data table, when measurements are significantly close to each other, when measurement are unreliable, and/or when the channel is changing too fast to benefit from a static configuration, among others. In these circumstances, it may be beneficial to institute dynamic polarization.

1. Error Correction

Figure 6A:
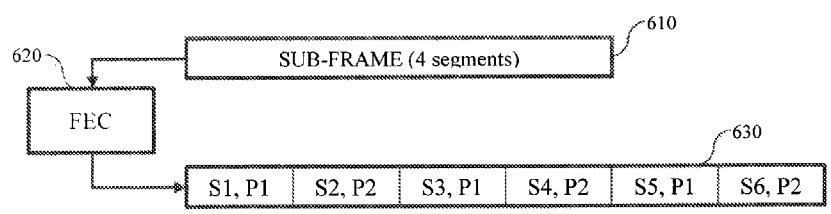
FIG. 6A illustrates an exemplary encoding and transmission technique of a data sub-frame.
Figure 6B:
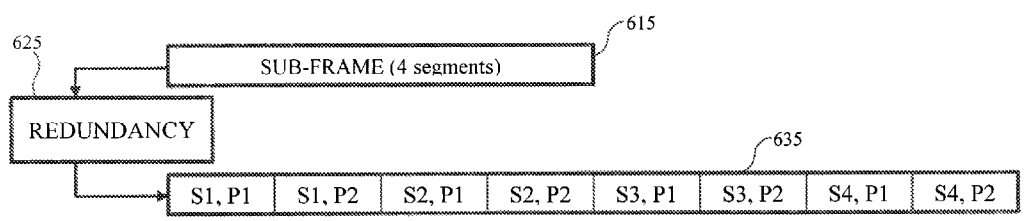
FIG. 6B illustrates an exemplary encoding and transmission technique of a data sub-frame.

In one example, a dynamic polarization configuration can be utilized in order to aid in error correction. FIGS. 6A and 6B illustrate exemplary encoding and transmission techniques that utilize polarity parameters.

FIG. 6A specifically illustrates a forward error correcting (FEC) technique that utilizes signal polarization. As shown in FIG. 6A, an exemplary data sub-frame 610 may be 4 segments in length, with each segment containing the same number of bits. The sub-frame 610 passes through an FEC module 620, which encodes the original sub-frame with redundancy or parity to generate an encoded sub-frame 630. The number of redundancy/parity bits added to the signal depend on a coding rate employed by the FEC module 620, which may vary depending on one or more conditions. For example, the number of the redundancy/parity bits may increase as channel quality decreases.

As shown in FIG. 6A, the exemplary encoded sub-frame 630 includes 6 segments, each having the same number of bits as the segments of the original data sub-frame 610. During transmission, the first wireless communication device 201 transmits the segments with alternating polarity. For example, the first wireless communication device 201 transmits segment S1 with polarity P1; segment S2 with polarity P2; segment S3 with polarity P1; segment S4 with polarity P2; segment S5 with polarity P1; and segment S6 with polarity P2.

In this manner, the devices can utilize the benefits of diversity during communication. For example, segments utilizing the polarization P1 may be received by the second wireless communication device 202 with worse link quality than the segments utilizing polarization P2. During decoding, the second wireless communication device 202 can rely on the increased quality of the P2 segments for decoding the proper signal, despite the P1 segments being received at lower link quality.

FIG. 6B specifically illustrates a redundancy error correcting technique that utilizes signal polarizations. As shown in FIG. 6B, an exemplary data sub-frame 615 may be 4 segments in length, with each segment containing the same number of bits. The sub-frame passes through a redundancy module 625, which encodes the original sub-frame with redundancy to generate an encoded sub-frame 635. During the redundancy encoding, the redundancy module 625 essential repeats each of the 4 segments for each polarity.

Consequently, the resulting encoded sub-frame 635 includes 8 segments (equal to twice the number of original segments), each having the same number of bits as the segments of the original data sub-frame 615. During transmission, the first wireless communication device 201 transmits the segments with alternating polarity. For example, the first wireless communication device 201 transmits segment S1 with polarity P1; segment S1 again with polarity P2; segment S2 with polarity P1; segment S2 again with polarity P2; segment S3 with polarity P1; segment S3 again with polarity P2; segment S4 with polarity P1; and segment S4 again with polarity P2.

In this manner, the devices again utilize the benefits of diversity during communication. For example, segments received by the second wireless communication device 202 can be recombined based on their respective signal qualities. Specifically, if the second wireless communication device 202 determines that the P1 segments have a lower signal quality than the P2 segments, the second wireless communication device 202 can decode the original signal, giving more weight to the P2 segments than the P1 segments.

Although this technique has been described with respect to single redundancy (transmitting each segment one additional time), similar principles can be applied to multiple redundancy (transmitting each segment more than one additional time). By weighing the accuracy of the received segments based on the quality of their corresponding polarizations, transmission bit errors can more easily and efficiently be identified and corrected.

As shown above, these exemplary configurations constitute dynamic polarization configurations because they transmit consecutive segments of information (from even a single data sub-frame) using different polarities. However, dynamic polarization configurations are not limited to these examples, and may also include configurations in which the polarization automatically switched for each data sub-frame, or after each group of sub-frames, and any combination thereof.

2. Polarization Switching

Similar to static polarization switching, the wireless communication devices must have some algorithm or method for determining when to remain in a static polarization configuration, and when it becomes necessary or desirable to switch to a dynamic polarization configuration.

Figure 7:
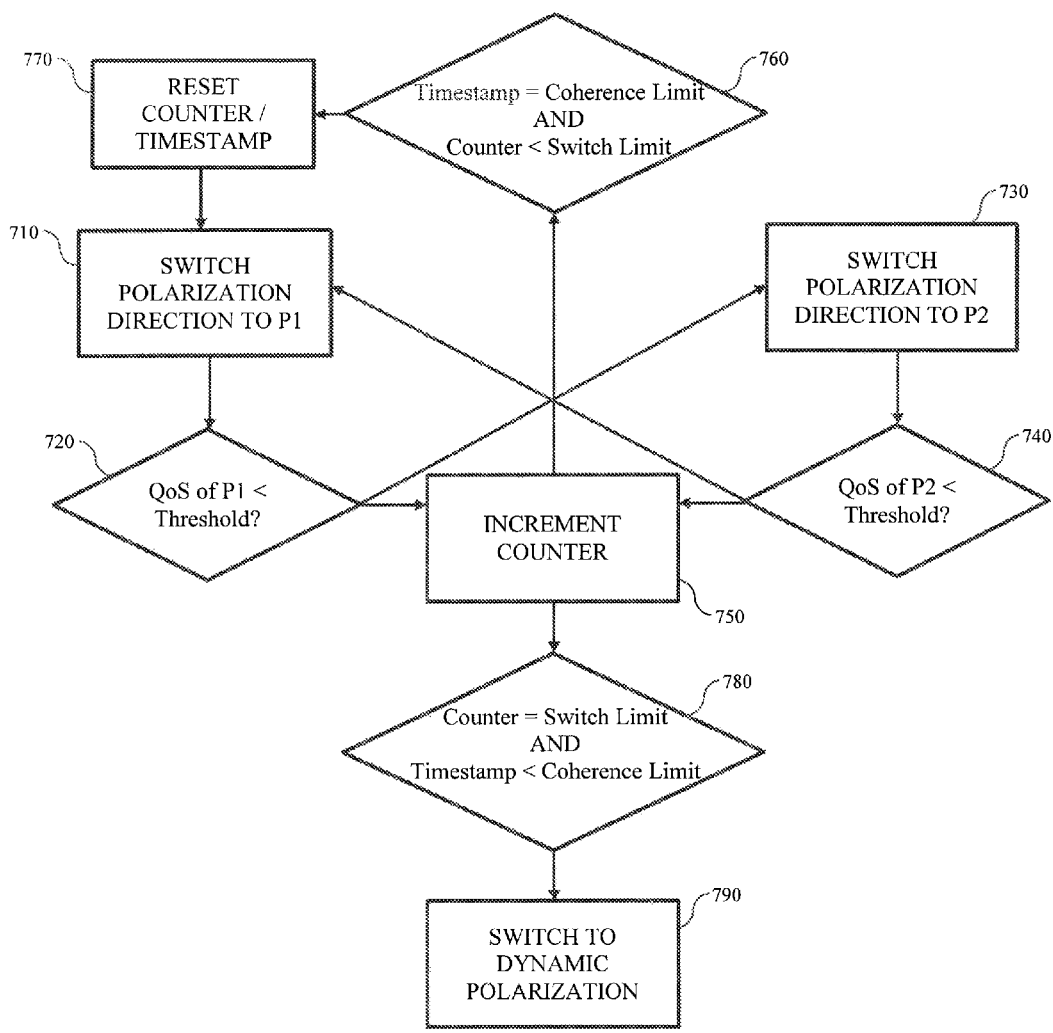
FIG. 7 illustrates a block diagram of an exemplary method for selecting a polarization configuration of transmitted signals.

FIG. 7 illustrates a block diagram of an exemplary method for selecting a polarization configuration of transmitted signals. In FIG. 7, steps 710-740 substantially correspond to steps 410-440, respectively, which are described above. Specifically, the first wireless communication device 201 transmits signals in either the first polarity or the second polarity (710, 730 respectively). When the signal quality of signal received in the currently-selected polarity falls below a predetermined threshold (720, 740 respectively), the second wireless communication device 202 initiates a polarization switch (730, 710 respectively).

In order to also account for the possibility of switching into a dynamic polarization configuration, the method of FIG. 4 can simply be modified with additional steps. In particular, as shown in FIG. 7, each time the receiver initiates a static polarization switch, it also increments a counter (750), and continues to monitor this counter relative to a timestamp.

In a first scenario, the timestamp reaches some time limit (e.g., a coherence limit) prior to the counter reaching some counter limit (e.g., switch limit) (760). This indicates that static polarization selections are sufficiently coherent to warrant remaining in static polarization configurations. In other words, the polarizations have not switched too many times over the last time interval (as measured by the coherence time limit). Therefore, the devices can continue to operate in static polarization configurations. Consequently, the counter and the timestamp are resent (770), and the procedure continues in static mode.

In a second scenario, the counter reaches the switch limit prior to the timestamp reaching the coherence limit (780). This indicates that static polarization selections have become insufficient for any of the reasons discussed above. In other words, the polarizations have been switched too many times over the last time interval (as measured by the coherence time limit). Therefore, the devices should switch to a dynamic polarization configuration (790).

Using this algorithm, the wireless communication devices can efficiently determine when it becomes necessary to switch from static polarization configurations to a dynamic polarization configuration. Further, although not illustrated, the second wireless communication device 202 can re-enter static mode by monitoring the channel responses and/or signal qualities of the differently-polarized signals, and determining that one polarization has become significantly stronger than the other or that the channel is no longer fluctuating as rapidly as before. In this manner, even further improvement or optimization can be achieved during communication between the first and second wireless communication devices.

Exemplary Computer System Implementation

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 8:
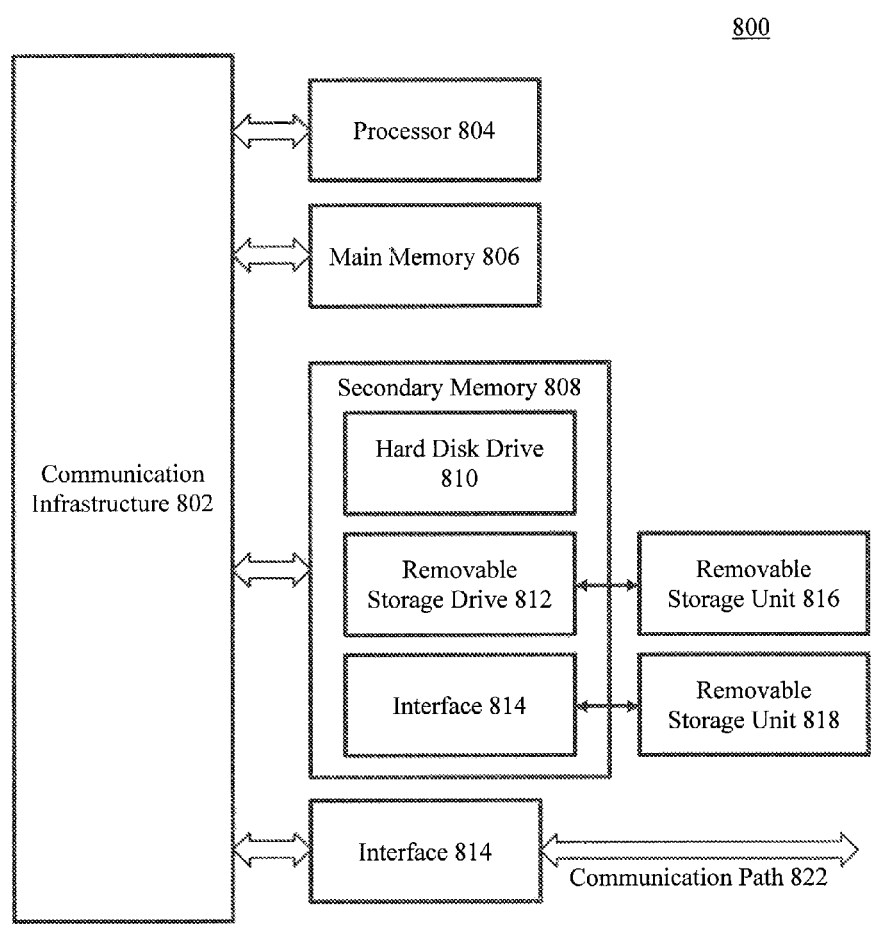
FIG. 8 illustrates an exemplary computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 800 is shown in FIG. 8. One or more of the modules depicted in the previous figures can be at least partially implemented on one or more distinct computer systems 800, including, for example, the controller modules 210 and 260, polarity setting module 220, framing module 230, decoder module 250, measurement module 280, and decision module 290.

Computer system 800 includes one or more processors, such as processor 804. Processor 804 can be a special purpose or a general purpose digital signal processor. Processor 804 is connected to a communication infrastructure 802 (for example, a bus or network). Various software implementations are described in terms of this exemplary computer system. After reading this description, it will become apparent to a person skilled in the relevant art(s) how to implement the disclosure using other computer systems and/or computer architectures.

Computer system 800 also includes a main memory 806, preferably random access memory (RAM), and may also include a secondary memory 808. Secondary memory 808 may include, for example, a hard disk drive 810 and/or a removable storage drive 812, representing a floppy disk drive, a magnetic tape drive, an optical disk drive, or the like. Removable storage drive 812 reads from and/or writes to a removable storage unit 816 in a well-known manner. Removable storage unit 816 represents a floppy disk, magnetic tape, optical disk, or the like, which is read by and written to by removable storage drive 812. As will be appreciated by persons skilled in the relevant art(s), removable storage unit 816 includes a computer usable storage medium having stored therein computer software and/or data.

In alternative implementations, secondary memory 808 may include other similar means for allowing computer programs or other instructions to be loaded into computer system 800. Such means may include, for example, a removable storage unit 818 and an interface 814. Examples of such means may include a program cartridge and cartridge interface (such as that found in video game devices), a removable memory chip (such as an EPROM, or PROM) and associated socket, a thumb drive and USB port, and other removable storage units 818 and interfaces 814 which allow software and data to be transferred from removable storage unit 818 to computer system 800.

Computer system 800 may also include a communications interface 820. Communications interface 820 allows software and data to be transferred between computer system 800 and external devices. Examples of communications interface 820 may include a modem, a network interface (such as an Ethernet card), a communications port, a PCMCIA slot and card, etc. Software and data transferred via communications interface 820 are in the form of signals which may be electronic, electromagnetic, optical, or other signals capable of being received by communications interface 820. These signals are provided to communications interface 820 via a communications path 822. Communications path 822 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 816 and 818 or a hard disk installed in hard disk drive 810. These computer program products are means for providing software to computer system 800.

Computer programs (also called computer control logic) are stored in main memory 806 and/or secondary memory 808. Computer programs may also be received via communications interface 820. Such computer programs, when executed, enable the computer system 800 to implement the present disclosure as discussed herein. In particular, the computer programs, when executed, enable processor 804 to implement the processes of the present disclosure, such as any of the methods described herein. Accordingly, such computer programs represent controllers of the computer system 800. Where the disclosure is implemented using software, the software may be stored in a computer program product and loaded into computer system 800 using removable storage drive 812, interface 814, or communications interface 820.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the invention should not be limited by any of the above-described exemplary embodiments, but should be defined only in accordance with the following claims and their equivalents.

What is claimed is:

1. A wireless communication device for use within a wireless communication environment, the wireless communication device comprising:
   a polarity setting module configured to set a polarity mode as one of a first polarity mode, a second polarity mode, or a dynamic polarity mode;
   a framing module configured to generate a data sub-frame for transmission, wherein the data sub-frame includes a channel estimation field that includes a first polarity portion and a second polarity portion; and
   an antenna module configured to transmit the first polarity portion in a first polarity, and the second polarity portion in a second polarity orthogonal to the first polarity,
   wherein, when the dynamic polarity mode is set, the framing module is configured to generate the data sub-frame such that first segments of the data sub-frame have the first polarity and second segments of the data sub-frame have the second polarity.

2. The wireless communication device of claim 1, further comprising:
   an antenna array configured to transmit the data sub-frame to the wireless communication environment with the designated polarities.

3. The wireless communication device of claim 1, wherein the framing module is configured to generate the data sub-frame so that a remainder of the data sub-frame is designated for transmission using one of the first polarity or the second polarity based on information received from a second wireless communication device.

4. The wireless communication device of claim 1, wherein the framing module is configured to set a size of the first polarity portion different from a size of the second polarity portion.

5. The wireless communication device 4, wherein the framing module is configured to set the size of the first polarity portion and the size of the second polarity portion based on information received from a second wireless communication device.

6. The wireless communication device of claim 4, wherein the framing module is configured to generate the data sub-frame so that a remainder of the data sub-frame is designated for transmission using one of the first polarity or the second polarity, and
   wherein the framing module is configured to set the size of the first polarity portion and the size of the second polarity portion based on whether the remainder of the data sub-frame is designated for transmission using the first polarity or the second polarity.

7. A wireless communication device that wirelessly communicates with an external device, the wireless communication device comprising:
   an antenna module configured to receive, from the external device, a data sub-frame having a channel estimation field that includes a first polarity portion and a second polarity portion, the first polarity portion being received in a first polarity and the second polarity portion being received in a second polarity;
   a measurement module configured to measure a first polarity channel response based on the first polarity portion of the channel estimation field, and to measure a second polarity channel response based on the second polarity portion of the channel estimation field; and
   a decision module configured to determine whether to initiate a switch from the first polarity to the second polarity by comparing a signal quality of the received data sub-frame to a predetermined threshold,
   wherein the decision module is configured to track, within a predetermined time period, a number of times the switch has been initiated to determine whether to initiate a switch from a static polarization mode to a dynamic polarization mode.

8. The wireless communication device of claim 7, further comprising a decision module configured to determine whether to initiate the switch from the first polarity to the second polarity by comparing the measured first polarity channel response and second polarity channel response,
   wherein the data sub-frame is received in the first polarity.

9. The wireless communication device of claim 8, wherein the decision module is configured to initiate the switch when the second polarity channel response exceeds the first polarity channel response by a second predetermined threshold.

10. The wireless communication device of claim 7, wherein if the predetermined time period expires before the number reaches a predetermined switch limit, the decision module is configured to reset the number for a subsequent predetermined time period.

11. The wireless communication device of claim 7, wherein if the number reaches a predetermined switch limit before the predetermined time period expires, the decision module is configured to initiate a switch to a dynamic polarization mode.

12. The wireless communication device of claim 11, wherein a subsequent data sub-frame received during the dynamic polarization mode includes a first segment received in the first polarity and a second segment received in the second polarity.

13. A wireless communication device capable of wirelessly communicating with an external device, the wireless communication device comprising:
   a polarity setting module configured to set a polarity mode as one of a first polarity mode, a second polarity mode, or a dynamic polarity mode based on an instruction received from the external device; and
   a framing module configured to generate a data sub-frame for transmission to the external device based on the polarity mode set by the polarity setting module, wherein, when the dynamic polarity mode is set, the framing module is configured to generate the data sub-frame such that first segments of the data sub-frame have a first polarity and second segments of the data sub-frame have a second polarity.

14. The wireless communication device of claim 13, wherein the framing module is configured to generate the data sub-frame to substantially have the first polarity when the first polarity mode is set, and
wherein the framing module is configured to generate the data sub-frame to substantially have the second polarity when the second polarity mode is set.

15. The wireless communication device of claim 13, wherein the framing module is configured to generate the data sub-frame such that the first segments and the second segments are arranged in an alternating manner.

16. The wireless communication device of claim 15, wherein the framing module is configured to generate the data sub-frame by encoding an information signal.

17. The wireless communication device of claim 15, wherein the framing module is configured to generate the data sub-frame from an information signal having information segments, and
wherein the framing module is configured to generate the data sub-frame such that the first segments include the information segments and the second segments include the information segments.

\* \* \* \* \*